US012684001B2

(12) United States Patent
Seri et al.

(10) Patent No.: US 12,684,001 B2
(45) Date of Patent: Jul. 14, 2026

(54) SYSTEM AND METHOD FOR MITIGATING CYBER THREATS USING RISK ANALYSIS

(71) Applicant: Zafran Security LTD, Tel Aviv (IL)

(72) Inventors: Ben Seri, Ramat Gan (IL); Snir Havdala, Tel Aviv (IL)

(73) Assignee: Zafran Security LTD, Tel Aviv (IL)

( * ) Notice: Subject to any disclaimer, the term of this patent is extended or adjusted under 35 U.S.C. 154(b) by 316 days.

(21) Appl. No.: 18/450,871

(22) Filed: Aug. 16, 2023

(65) Prior Publication Data

US 2025/0063061 A1 Feb. 20, 2025

(51) Int. Cl.
*H04L 9/40* (2022.01)

(52) U.S. Cl.
CPC ........ *H04L 63/1433* (2013.01); *H04L 63/145* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 9,058,492 B1 | 6/2015 | Satish | |
| 9,117,069 B2 | 8/2015 | Oliphant et al. | |
| 9,306,965 B1 | 4/2016 | Grossman et al. | |
| 9,659,182 B1 * | 5/2017 | Roundy .............. G06F 21/6218 | |
| 9,680,855 B2 | 6/2017 | Schultz et al. | |
| 9,792,443 B1 | 10/2017 | Sheridan et al. | |
| 9,967,279 B2 | 5/2018 | Chesla et al. | |

| | | | |
|---|---|---|---|
| 9,977,905 B2 * | 5/2018 | Li .......................... G06F 21/577 |
| 9,979,753 B2 | 5/2018 | Chesla |
| 10,038,715 B1 | 7/2018 | Majkowski et al. |
| 10,102,533 B2 | 10/2018 | Barday |
| 10,187,422 B2 | 1/2019 | Akcin |
| 10,250,619 B1 | 4/2019 | Park et al. |
| 10,282,550 B1 | 5/2019 | Sheridan et al. |
| 10,496,803 B2 | 12/2019 | Barday et al. |
| 10,546,134 B2 | 1/2020 | Abdine et al. |
| 10,558,809 B1 * | 2/2020 | Joyce ................... G06F 21/577 |
| 10,609,063 B1 | 3/2020 | Oliphant et al. |
| 10,754,958 B1 * | 8/2020 | Sidagni ................ G06F 21/552 |

(Continued)

FOREIGN PATENT DOCUMENTS

| | | |
|---|---|---|
| CN | 102222041 A | 10/2011 |

OTHER PUBLICATIONS

International Search Report for PCT/IB2025/052901 dated Jun. 23, 2025. Searching Authority: Israel Patent Office, Jerusalem, Israel.

(Continued)

*Primary Examiner* — Khang Do

(74) *Attorney, Agent, or Firm* — M&B IP Analysts, LLC

(57) ABSTRACT

A system and method for mitigating cyber-threats. A method includes analyzing data in-memory for at least one software component during execution of each of the at least one software component; generating a base risk score based on the analysis of the data in-memory; analyzing a configuration of each of at least one security control with respect to the at least one software component; generating an applicable score based on the base risk score and the analysis of the configuration of each of the at least one security control; and mitigating at least one cyber-threat with respect to the at least one software component based on the applicable score.

13 Claims, 8 Drawing Sheets

(56) References Cited

U.S. PATENT DOCUMENTS

| | | | | |
|---|---|---|---|---|
| 10,873,595 | B1 | 12/2020 | Oliphant et al. | |
| 10,893,066 | B1 | 1/2021 | Oliphant et al. | |
| 11,012,466 | B2 | 5/2021 | Gilmore et al. | |
| 11,431,740 | B2 | 8/2022 | Heckman et al. | |
| 11,475,023 | B2 | 10/2022 | Gould et al. | |
| 11,483,332 | B2 | 10/2022 | Crabtree et al. | |
| 11,516,222 | B1* | 11/2022 | Srinivasan | G06F 21/577 |
| 11,533,332 | B2 | 12/2022 | Engelberg et al. | |
| 11,539,720 | B2 | 12/2022 | Reybok, Jr. et al. | |
| 11,550,903 | B1* | 1/2023 | Epstein | G06F 21/57 |
| 11,757,923 | B1 | 9/2023 | Vandeventer et al. | |
| 11,848,956 | B2 | 12/2023 | Shua | |
| 11,874,932 | B2* | 1/2024 | Chapman | G06F 21/577 |
| 12,069,076 | B2* | 8/2024 | Mohanta | H04L 63/1441 |
| 12,095,787 | B1 | 9/2024 | Seri et al. | |
| 12,107,869 | B1* | 10/2024 | Kannan | H04L 63/20 |
| 12,177,243 | B1* | 12/2024 | Steers | H04L 63/205 |
| 12,184,687 | B1* | 12/2024 | Havdala | H04L 63/1425 |
| 2006/0101517 | A1 | 5/2006 | Banzhof et al. | |
| 2008/0209563 | A1 | 8/2008 | Rogers et al. | |
| 2009/0307777 | A1 | 12/2009 | He et al. | |
| 2010/0198636 | A1* | 8/2010 | Choudhary | G06F 21/552 726/1 |
| 2013/0191919 | A1* | 7/2013 | Basavapatna | H04L 63/20 726/25 |
| 2013/0247205 | A1* | 9/2013 | Schrecker | G06F 21/577 726/25 |
| 2013/0276110 | A1* | 10/2013 | Dalcher | G06F 21/554 726/23 |
| 2014/0020092 | A1 | 1/2014 | Davidov | |
| 2014/0130157 | A1* | 5/2014 | Sallam | G06F 21/561 726/23 |
| 2014/0137257 | A1* | 5/2014 | Martinez | H04L 63/1433 726/25 |
| 2015/0033287 | A1 | 1/2015 | Oliphant et al. | |
| 2015/0040232 | A1 | 2/2015 | Oliphant et al. | |
| 2016/0164908 | A1* | 6/2016 | Satish | H04L 63/1416 |
| 2016/0188243 | A1* | 6/2016 | Dementiev | G06F 9/467 711/163 |
| 2016/0357958 | A1* | 12/2016 | Guidry | G06F 21/53 |
| 2016/0364229 | A1 | 12/2016 | Higginson et al. | |
| 2017/0104779 | A1* | 4/2017 | Middleman | G06F 21/577 |
| 2017/0126716 | A1* | 5/2017 | Suominen | H04L 63/1416 |
| 2017/0187743 | A1* | 6/2017 | Madou | G06F 21/566 |
| 2018/0124092 | A1* | 5/2018 | Pope | H04L 63/20 |
| 2018/0181752 | A1* | 6/2018 | Guri | G06F 21/554 |
| 2018/0211033 | A1* | 7/2018 | Aditham | G06F 21/52 |
| 2018/0336356 | A1 | 11/2018 | Papaxenopoulos et al. | |
| 2019/0251258 | A1* | 8/2019 | Walters | G06F 21/566 |
| 2019/0318100 | A1* | 10/2019 | Bhatia | G06F 21/554 |
| 2019/0384586 | A1 | 12/2019 | Jiang | |
| 2020/0027096 | A1 | 1/2020 | Cooner | |
| 2020/0162497 | A1* | 5/2020 | Iyer | H04L 63/164 |
| 2020/0210591 | A1* | 7/2020 | Monastyrsky | G06F 21/53 |
| 2020/0228560 | A1 | 7/2020 | Murthy et al. | |
| 2020/0252422 | A1* | 8/2020 | Davis | H04L 63/102 |
| 2020/0351294 | A1 | 11/2020 | Davis et al. | |
| 2020/0389482 | A1* | 12/2020 | Engle | G06N 20/00 |
| 2021/0273968 | A1 | 9/2021 | Shaieb et al. | |
| 2021/0329025 | A1 | 10/2021 | Ganor | |
| 2021/0352099 | A1 | 11/2021 | Rogers | |
| 2021/0390182 | A1* | 12/2021 | Boutnaru | G06F 8/433 |
| 2022/0019676 | A1* | 1/2022 | Guo | G06F 21/577 |
| 2022/0027471 | A1* | 1/2022 | Levy | G06F 21/6218 |
| 2022/0078210 | A1 | 3/2022 | Crabtree et al. | |
| 2022/0109681 | A1 | 4/2022 | Hamdi | |
| 2022/0131888 | A1* | 4/2022 | Kanso | H04L 63/1433 |
| 2022/0179967 | A1* | 6/2022 | Karlsson | G06Q 10/0635 |
| 2022/0210200 | A1 | 6/2022 | Crabtree et al. | |
| 2022/0286474 | A1* | 9/2022 | Kuppa | H04L 63/145 |
| 2022/0327201 | A1* | 10/2022 | Ganesan | G06F 21/577 |
| 2022/0345469 | A1* | 10/2022 | Domagalski | H04L 63/1433 |
| 2022/0345477 | A1 | 10/2022 | Criscione | |
| 2023/0044579 | A1* | 2/2023 | Ike | G06F 21/566 |
| 2023/0088197 | A1 | 3/2023 | Cline | |
| 2023/0222222 | A1* | 7/2023 | Pagnozzi | G06F 8/65 726/22 |
| 2023/0229788 | A1* | 7/2023 | Pieno | G06F 16/24552 726/25 |
| 2023/0239317 | A1 | 7/2023 | Ganesan et al. | |
| 2023/0259632 | A1 | 8/2023 | Marciano et al. | |
| 2023/0283629 | A1* | 9/2023 | Boyer | H04L 63/1416 726/22 |
| 2023/0344797 | A1 | 10/2023 | Filatov et al. | |
| 2023/0370486 | A1* | 11/2023 | Paquette | H04L 63/1433 |
| 2023/0388346 | A1* | 11/2023 | Kulshreshtha | H04L 63/20 |
| 2024/0028707 | A1* | 1/2024 | Paul | G06F 21/53 |
| 2024/0104192 | A1 | 3/2024 | Kalle et al. | |
| 2024/0111860 | A1* | 4/2024 | Strogov | G06F 21/554 |
| 2024/0121259 | A1* | 4/2024 | Imrem | H04L 63/102 |
| 2024/0129318 | A1 | 4/2024 | Vandeventer et al. | |
| 2024/0163312 | A1* | 5/2024 | Azad | H04L 63/20 |
| 2024/0248963 | A1* | 7/2024 | Parham | G06F 18/2415 |
| 2024/0248995 | A1 | 7/2024 | Gazit et al. | |
| 2024/0330481 | A1* | 10/2024 | Roytman | G06F 16/334 |
| 2024/0386099 | A1* | 11/2024 | Weizman | G06F 21/577 |
| 2024/0394383 | A1* | 11/2024 | Zettel, II | G06F 21/577 |
| 2025/0013754 | A1* | 1/2025 | Davidovich | G06F 21/577 |
| 2025/0023899 | A1* | 1/2025 | Burshan | H04L 63/1433 |
| 2025/0063061 | A1* | 2/2025 | Seri | H04L 63/145 |
| 2025/0310372 | A1* | 10/2025 | Havdala | H04L 63/1433 |

OTHER PUBLICATIONS

Written Opinion of the Searching Authority for PCT/IB2025/052901 dated Jun. 23, 2025. Searching Authority: Israel Patent Office, Jerusalem, Israel.

International Searching Authority for PCT/IB2024/055666, dated Sep. 16, 2024. International Searching Authority, Israel Patent Office, Jerusalem, Israel.

Written Opinion of the Searching Authority for PCT/IB2024/055666, dated Sep. 16, 2024. International Searching Authority, Israel Patent Office, Jerusalem, Israel.

Dissanayake, Nesara et al., "Software Security Patch Management—A Systematic Literature Review of Challenges, Approaches, Tools and Practices", Journal of Latex Templates Aug. 23, 2021.

Huszcza, Krysztof. "Reachable Vulnerabilities: How to Effectively Prioritize Open Source Security." Snyk, Aug. 18, 2020.

Rezilion, "Runtime Memory Analysis: A Better Way Forward for Vulnerability Management," 2019.

International Search Report for PCT/IB2024/055667, dated Oct. 1, 2024. Searching Authority, Israel Patent Office, Jerusalem, Israel.

Written Opinion of the Searching Authority for PCT/IB2024/055667, dated Oct. 1, 2024. Searching Authority, Israel Patent Office, Jerusalem, Israel.

"NSA'S Top Ten Cybersecurity Mitigation Strategies", obtained online from , retrieved on Apr. 19, 2025. (Year: 2018).

Cooper et al., Network Working Group Request for Comments: 5280, "Internet X.509 Public Key Infrastructure Certificate and Certificate Revocation List (CRL) Profile", May 2008, obtained online from <https://www.rfc-editor.org/rfc/pdfrfc/rfc5280.txt.pdf>, retrieved on Jan. 27, 2026. (Year: 2008).

* cited by examiner

100A

200

SYSTEM AND METHOD FOR MITIGATING CYBER THREATS USING RISK ANALYSIS

CROSS-REFERENCE TO RELATED APPLICATIONS

This application is related to U.S. Non-Provisional application Ser. No. 18/334,007 filed on Jun. 13, 2023, the contents of which are hereby incorporated by reference.

TECHNICAL FIELD

The present disclosure relates generally to cybersecurity threat mitigation, and more specifically to utilizing in-memory runtime analysis in order to aid in threat analysis and mitigation.

BACKGROUND

Cyber vulnerabilities refer to weaknesses or flaws in software, hardware, or network systems which could be exploited by cyber attackers in order to gain unauthorized access, to steal or manipulate data, or to disrupt critical operations. These vulnerabilities can be caused by various factors such as, but not limited to, programming errors, misconfigurations, outdated software, or lack of security awareness.

Cyber vulnerabilities (also sometimes simply referred to as vulnerabilities) can cause severe consequences for individuals, businesses, governments, and other organizations. These consequences can include financial losses, reputational damage, and even threats to national security. It is crucial for many entities to identify and mitigate cyber vulnerabilities through regular security assessments, updates, and training, in order to reduce the risk of cyber-attacks.

New vulnerabilities are constantly being discovered and reported, for example, in the form of entries in common vulnerabilities and exposures (CVE). CVE is a database with entries representing known vulnerabilities and exposures, and can be used to provide a common definition of any given vulnerability or exposure when communicating between different entities. Entries may be given identifiers such as a CVE number that are unique to each vulnerability or exposure in the CVE, and vulnerabilities and exposures can be referenced by their respective identifiers. In a CVE, a vulnerability is typically a weakness which can be exploited to gain unauthorized access or otherwise to perform unauthorized actions, while an exposure is a state in which an attacker has access to a system or network which it should not have.

The number of vulnerabilities being discovered has grown exponentially over the years. Timely mitigation of such vulnerabilities is key to securing computing assets against cyber threats. The ever-increasing number of vulnerabilities makes timely mitigating vulnerabilities increasingly challenging.

Some existing mitigation techniques include applying security patches, conducting security assessments, implementing access controls, and employing security technologies.

For security patches, vendors may release security patches to fix known vulnerabilities. Keeping hardware and software up-to-date with the latest patches can significantly reduce the risk of exploitation.

Security assessments may include vulnerability scans, penetration testing, code reviews, and the like. Conducting security assessments using experienced personnel regularly may help to identify vulnerabilities which might be missed by automated tools and/or untrained personnel.

Access controls may include passwords, two-factor authentication, privilege controls, and the like. Implementing access controls can limit access to sensitive systems and data, and may therefore reduce the risk of unauthorized access.

Security technologies such as firewalls, intrusion detection and prevention systems, antivirus software, and encryption can help protect against attacks and mitigate the impact of any successful attacks.

All of these techniques, while beneficial for reducing harm of cyber threats, face challenges that would be desirable to improve. In particular, many of these techniques require manual human intervention, which may slow response times and is subject to human error. Even further, some of these techniques may require human operators to use their own judgment, which can be a subjective process that yields different results for different operators.

Additionally, the reality of existing solutions is that vulnerabilities which are ultimately introduced into a computing environment can take a very long time to fix, which leaves open a large exploitation window in which the vulnerability can be exploited. A typical vulnerability lifetime may be like the following: vulnerability is introduced in a release at day 1, the vulnerability begins to be exploited at day 9, and code is patched to prevent the vulnerability at day 60 or later. Such a long window allows a lot of harm to potentially come from a given exploited vulnerability, which is compounded as the number of vulnerabilities and the number of assets to be protected increase.

Further, some existing vulnerability scanners analyze a file system via snapshot scanning using an agent, and are included among the code such that the vulnerability scanning software remains dormant until the code is run in-memory. These solutions face challenges in identifying runtime-specific issues, and generally can only identify issues which could otherwise be detected via static analysis pre-runtime.

It would therefore be advantageous to provide a solution that allows for better, faster, more objective, more accurate, and automated mitigation of vulnerabilities in computing environments.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for mitigating cyber-threats. The method comprises: analyzing data in-memory for at least one software component during execution of each of the at least one software component; generating a base risk score based on the analysis of the data in-memory; analyzing a configuration of each of at least one security control with respect to the at least one software component; generating an applicable score based on the base risk score and the analysis of the configuration of each of the at least one security control; and mitigating at least one cyber-threat with respect to the at least one software component based on the applicable score.

Certain embodiments disclosed herein also include a non-transitory computer readable medium having stored thereon causing a processing circuitry to execute a process, the process comprising: analyzing data in-memory for at least one software component during execution of each of the at least one software component; generating a base risk score based on the analysis of the data in-memory; analyzing a configuration of each of at least one security control with respect to the at least one software component; generating an applicable score based on the base risk score and the analysis of the configuration of each of the at least one security control; and mitigating at least one cyber-threat with respect to the at least one software component based on the applicable score.

Certain embodiments disclosed herein also include a system for mitigating cyber-threats. The system comprises: a processing circuitry; and a memory, the memory containing instructions that, when executed by the processing circuitry, configure the system to: analyze data in-memory for at least one software component during execution of each of the at least one software component; generating a base risk score based on the analysis of the data in-memory; analyze a configuration of each of at least one security control with respect to the at least one software component; generate an applicable score based on the base risk score and the analysis of the configuration of each of the at least one security control; and mitigate at least one cyber-threat with respect to the at least one software component based on the applicable score.

Certain embodiments disclosed herein include the method, non-transitory computer readable medium, or system noted above or below, wherein analyzing the data in-memory further comprises: identifying at least one library loaded into memory; and identifying the at least one software component corresponding to the at least one library loaded into memory.

Certain embodiments disclosed herein include the method, non-transitory computer readable medium, or system noted above or below, wherein the base risk score is generated with respect to at least one of: exploitability of the at least one software component, and reachability of the at least one software component.

Certain embodiments disclosed herein include the method, non-transitory computer readable medium, or system noted above or below, wherein the base risk score is generated with respect to asset criticality of at least one asset accessible via the at least one software component.

Certain embodiments disclosed herein include the method, non-transitory computer readable medium, or system noted above or below, wherein the plurality of capabilities of each of the security controls are analyzed with respect to at least one of: categories of vulnerabilities, and specific types of vulnerabilities.

Certain embodiments disclosed herein include the method, non-transitory computer readable medium, or system noted above or below, wherein the categories of vulnerabilities are determined based on a plurality of probabilities, wherein the plurality of probabilities is divided into at least one probability of being triggered via a network and at least one probability of being triggered via an endpoint.

Certain embodiments disclosed herein include the method, non-transitory computer readable medium, or system noted above or below, further including or being configured to perform the following steps: applying a generative AI model to generate a textual applicable score analysis based on the applicable score and the analysis of the data in-memory, wherein the textual applicable score analysis describes a history of potential vulnerabilities for the at least one software component.

Certain embodiments disclosed herein include the method, non-transitory computer readable medium, or system noted above or below, further including or being configured to perform the following steps: determining an existence of each of the at least one security control, wherein the applicable score is determined based further on the determined existence of each of the at least one security control.

Certain embodiments disclosed herein include the method, non-transitory computer readable medium, or system noted above or below, further including or being configured to perform the following steps: analyzing a plurality of capabilities of each of the at least one security control, wherein the applicable score is also based on the plurality of capabilities of each of the at least one security control.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
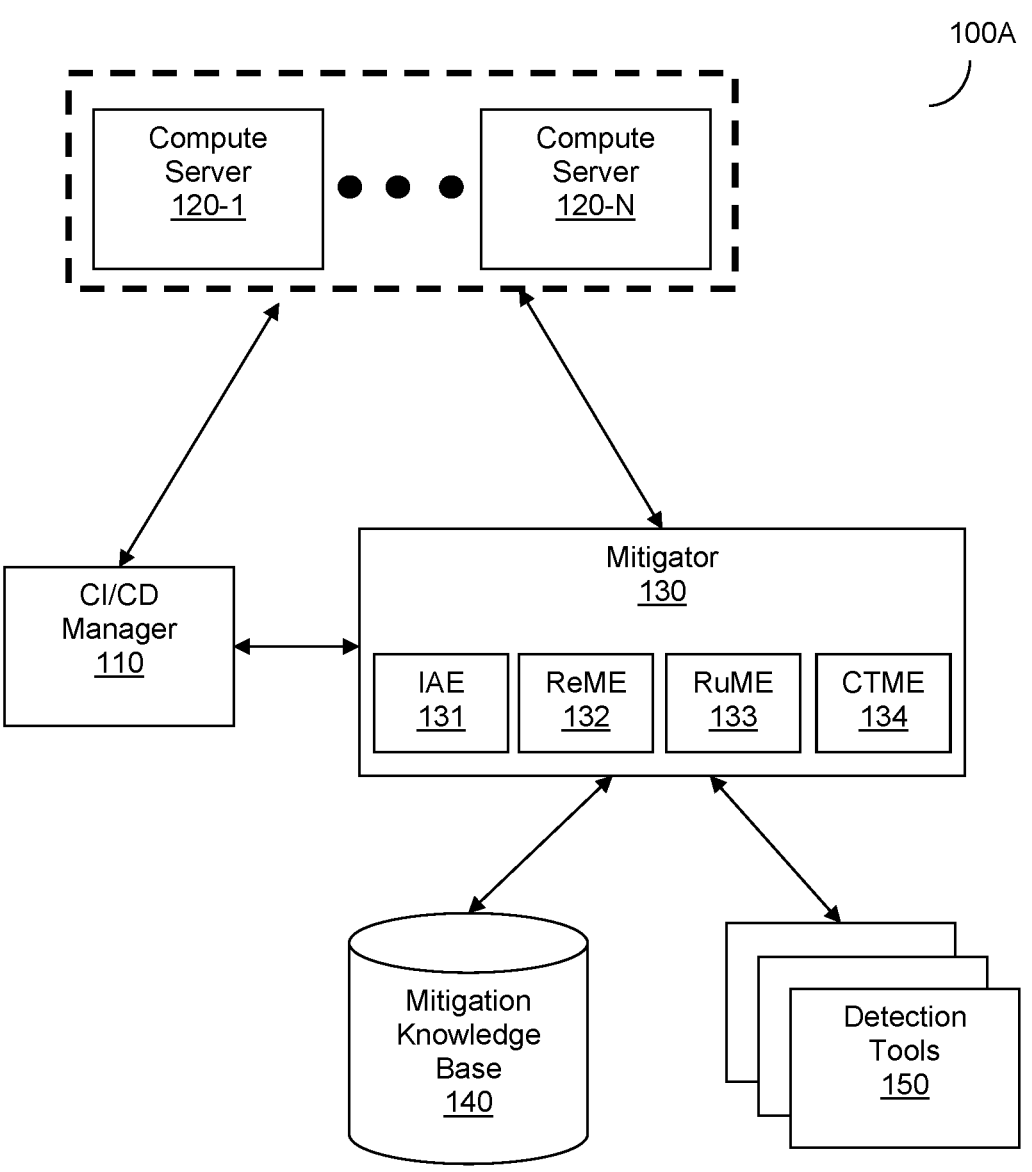
FIGS. 1A-B are network diagrams utilized to describe various disclosed embodiments.

The various disclosed embodiments include methods and systems for mitigating cyber vulnerabilities using risk analysis. In accordance with various disclosed embodiments, software components and versions thereof are discovered in-memory, for example at runtime during execution of components within a computing infrastructure. Potential reachability and exploitability of the discovered components are analyzed in order to detect potential vulnerabilities, for example, in the form of vulnerable states. Risk analysis is performed in order to prioritize the vulnerable states based on the likelihood and severity of potential risk of those vulnerable states being exploited. Mitigation actions are performed in order to mitigate the vulnerabilities in accordance with the prioritization in order to prioritize mitigating potential vulnerabilities related to higher risk vulnerable states.

The risk analysis may be performed based on factors such as, but not limited to, whether each vulnerable state is detected in a process or system having built-in processes, whether each vulnerable state imposes a path of exploitation, a severity of each vulnerable state, a reachability of each vulnerable state to a network through which protected assets can be accessed, complexity of trigger conditions for triggering the vulnerable state (e.g., to trigger the state to cause improper exposure of assets or otherwise grant improper access), and the like.

To this end, in various disclosed embodiments, the risk analysis includes analyzing software components in-memory at runtime and calculating risks of potential vulnerabilities based on security controls within the infrastructure (e.g., integrations allowing components within the infrastructure to access cybersecurity tools) and known effectiveness of different security controls against certain kinds of vulnerabilities. In this regard, the disclosed embodiments provide an ability to address vulnerabilities or other vulnerable states that may be exploited in-memory.

The in-memory analysis combined with the analysis of effectiveness of security controls in protecting against vulnerabilities, in accordance with various disclosed embodiments, allows for reducing false positive identifications of potential cyber threats and for more efficiently prioritizing most likely threats, which in turn improves the security of the infrastructure. Moreover, by more accurately identifying potential cyber threats, the disclosed embodiments may allow for more surgical precision in mitigating cyber threats.

To further support the risk analysis, the disclosed embodiments also include techniques for performing in-memory analysis of data which may be achieved without deploying a new agent in a component using the memory or otherwise with respect to a location where the memory is stored. Some embodiments utilize forensic data collection via existing agents deployed in the computing infrastructure in order to executes sets of instructions (e.g., in the form of scripts) for analyzing the memory. Alternatively or in combination, a set of instructions (e.g., in the form of a script) for analyzing the memory via one or more application programming interfaces (APIs) is executed. Such a script or other set of instructions may be realized without using a persistent agent. The data collected via such sets of instructions includes data utilized for risk analysis such that the risk analysis is based on runtime behavior (i.e., behavior represented in data loaded into memory at runtime), which allows for discovering new potential means of exploitation and indicators of reachability to the Internet, thereby allowing for more accurately analyzing potential risk of vulnerabilities by leveraging a more complete understanding of factors which affect risk as compared to performing only static analysis of asset files and runtime analysis of external behavioral observations.

Additionally, the disclosed embodiments provide techniques for exploitability and reachability analyses which may aid in more accurately analyzing risk. In an embodiment, exploitability is analyzed at least with respect to code flows in order to determine a likelihood of exploitability. In this regard, it has been identified that code flows which are known to be in use while exploiting a particular vulnerability may be indicative that an asset whose runtime behavior demonstrates the code flow is at higher risk of exploitation via that vulnerability. In an embodiment, reachability is analyzed at least partially by identifying a path from potentially vulnerable components within a computing infrastructure to the Internet. In a further embodiment, the path to the Internet is defined with respect to relevant security controls, i.e., integrations which allow for accessing cybersecurity tools that are relevant to a given asset insofar as the security controls indicate the asset or the asset otherwise utilizes those security controls.

In this regard, it is noted that some software components are used as resources which are not represented in a static file of a computer program. For example, some software components are resources in dynamic libraries which are linked within a program file and loaded into memory at runtime when the program file is executed. Static analysis of such a program file may therefore fail to identify some of the software components that may be used by the program which could affect security of a computing environment. Identifying software components in-memory allows for identifying more software components, thereby providing a more accurate evaluation of potential risks, which in turn may be utilized to more accurately prioritize or otherwise determine mitigation actions for securing the computing environment.

Additionally, many software components behave differently in-memory than may be reflected in a static file. Accordingly, analyzing software components in-memory further allows for more accurately determining potential risks presented by the actual in-memory behavior rather than the behavior which might be expected based on a static configuration.

Figure 1B:
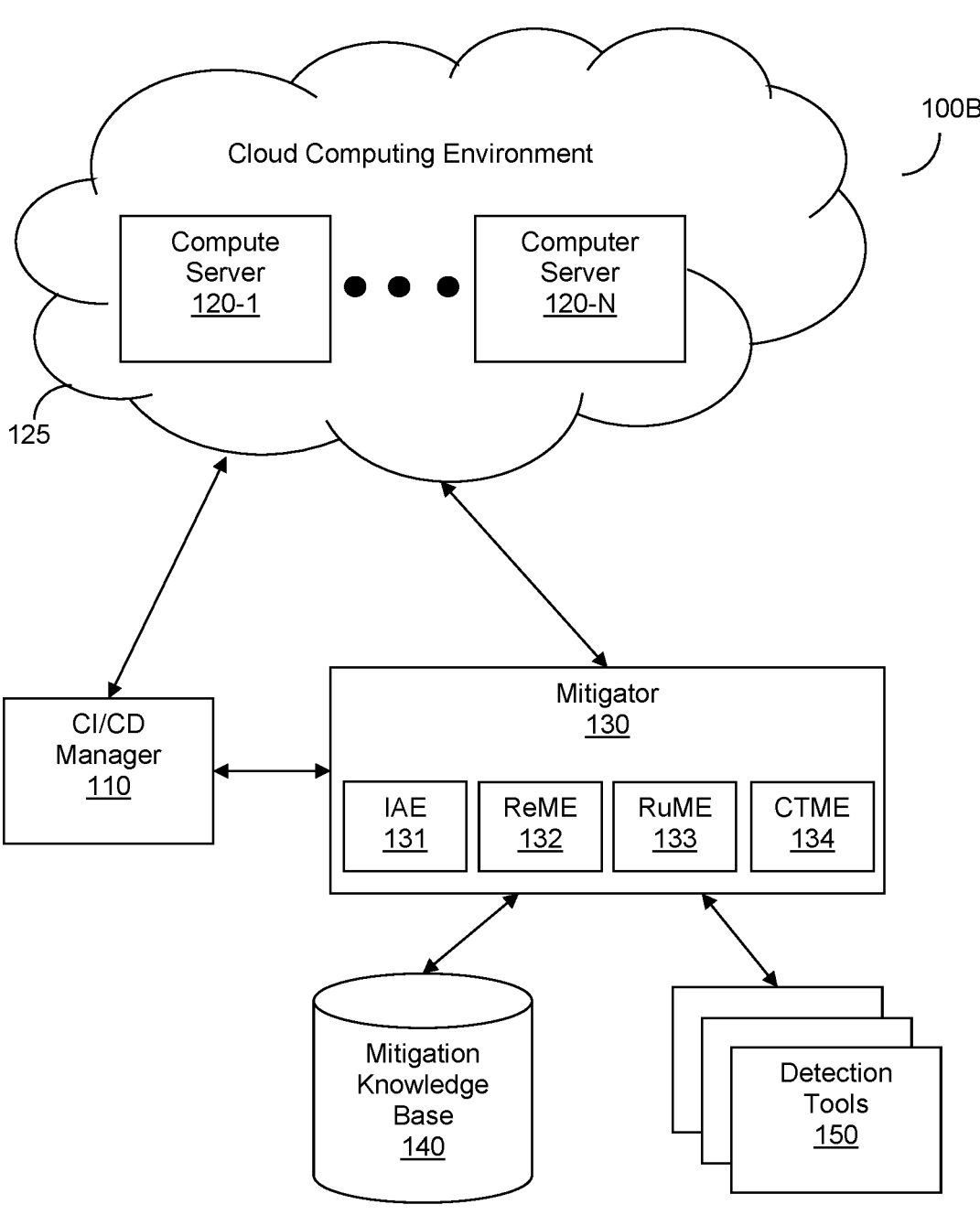

FIGS. 1A and 1B are example network diagrams 100A and 100B, respectively, utilized to describe various disclosed embodiments.

The network diagram 100A depicts an on-premises implementation in which a mitigator 130 is deployed on-premises with one or more compute servers 120-1 through 120-N (where N is an integer having a value equal to or greater than 1). As shown in the diagram 100A, the mitigator 130 communicates with a continuous integration/continuous development (CI/CD) manager 110, the compute servers 120, a mitigation knowledge base 140, and one or more detection tools 150.

The CI/CD manager 110 is configured to manage software components, hardware components, process components, and other parts of a computing infrastructure (not separately depicted) realized at least partially using the compute servers 120. To this end, the CI/CD manager 110 may be configured to deploy code uploaded by one or more developers (not shown), to enforce policies for the computing infrastructure (e.g., on the compute servers 120, both, and the like. When policies requiring signing code with artifacts are utilized as described herein, the CI/CD manager 110 may be configured to enforce such policies.

The compute servers 120 are configured to run processes and perform other activities pursuant to operation of the computing infrastructure in which they are deployed. In accordance with various disclosed embodiments, mitigation actions may be performed through the compute servers 120. To this end, in some embodiments, one or more artifacts are deployed in the compute servers 120, for example, as part of code deployed in the compute servers 120 via one or more code releases signed with the artifact as described herein. Accordingly, executable code of the artifact used to track and monitor mitigation activities as well as to perform code modification as described herein may be stored on or otherwise accessed and executed by the computer servers 120 in order to perform at least a portion of the disclosed embodiments.

The mitigator 130 is configured to perform at least a portion of the disclosed embodiments such as, but not limited to, building a mitigation knowledge base 140, performing impact analysis for vulnerable states, and performing mitigation actions (e.g., as described below with respect to FIG. 3). To this end, the mitigator 130 may be configured with any or all of an impact analysis engine (IAE) 131, a reachability mitigation engine (ReME) 132, a runtime mitigation engine (RuME) 133, and a compile time mitigation engine (CTME) 134. The impact analysis engine 131 is configured to perform impact analysis, for example as described further below with respect to FIG. 5. The engines 132, 133, and 134, are configured to perform mitigation actions related to reachability, runtime code modification, and compiler time code modification, respectively, for example as described further below with respect to FIG. 6.

The mitigation knowledge base 140 defines one or more possible mitigation actions to be performed by mitigation engines (e.g., any of the engines 132, 133, and 134) for each known vulnerable state. More specifically, the mitigation knowledge base defines respective mitigation actions to be performed by each mitigation engine for different vulnerable states such as, but not limited to, vulnerable states defined in one or more common vulnerabilities and exposures (CVE, not shown). In some implementations, the mitigation knowledge base 140 may be built by one or more other systems (not shown).

The detection tools 150 include cybersecurity detection tools which are configured to detect potential vulnerable states such as, but not limited to, vulnerabilities and exposures. To this end, the detection tools 150 may be configured to generate and send alerts about any detected vulnerable states to the mitigator 130 for use in impact analysis, mitigation, both, and the like. The detection tools 150 may alert on the vulnerable states using definitions of the vulnerable states from a CVE such that different detection tools may alert on vulnerable states in a comparable manner.

The network diagram 100B depicts a cloud-based implementation in which the compute servers 120 are deployed in a cloud computing environment 125. The mitigator 130, the CI/CD manager 110, or both, may be deployed outside of such a cloud computing environment 125 and may communicate with the compute servers 120 via one or more cloud networks, the Internet, or any other networks (not shown) utilized to enable communications with the compute servers 120. Such networks may include, but are not limited to, a wireless, cellular or wired network, a local area network (LAN), a wide area network (WAN), a metro area network (MAN), the Internet, the worldwide web (WWW), similar networks, and any combination thereof.

Figure 2:
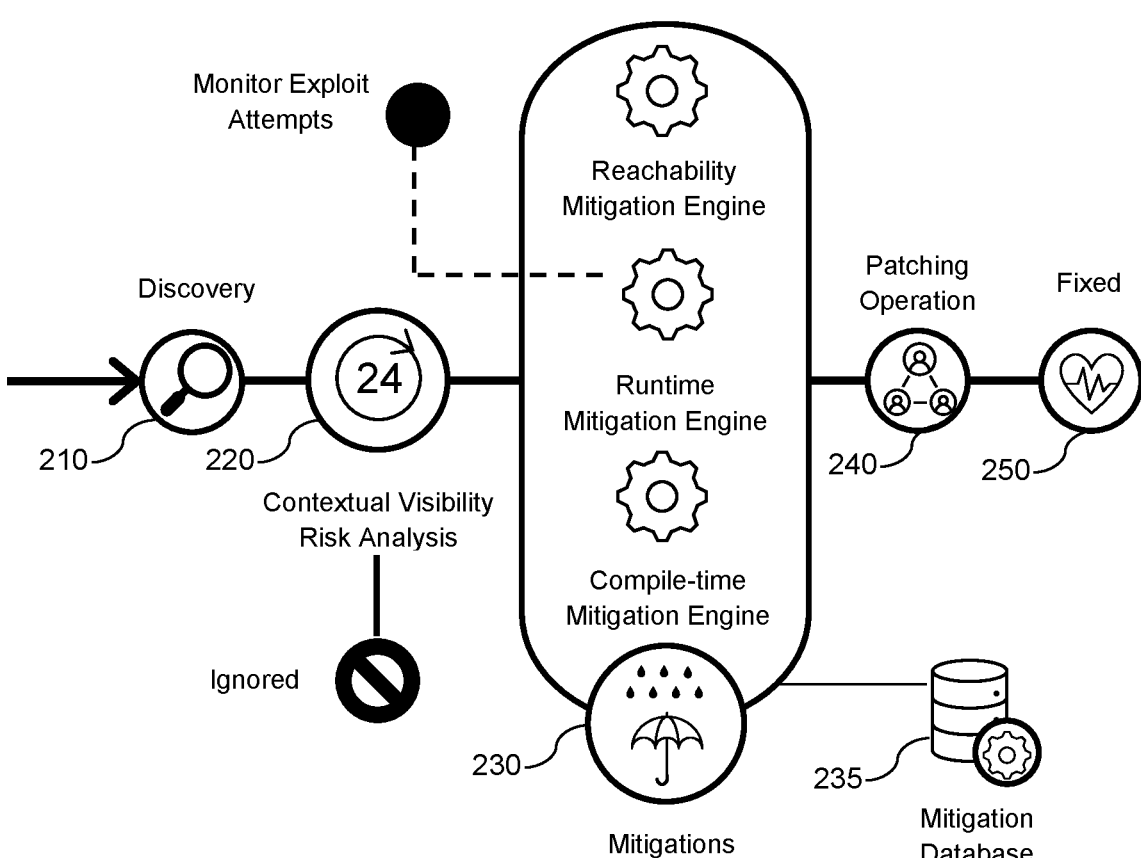
FIG. 2 is a flow diagram illustrating a process including vulnerable state mitigation.

FIG. 2 is a flow diagram 200 illustrating a process including vulnerability mitigation.

The process shown in FIG. 2 begins with discovery 210. The discovery 210 may be based on alerts or other data provided by one or more detection tools configured to detect vulnerable states (e.g., the detection tools 150, FIGS. 1A-B). The discovery 210 results in identifying different potentially vulnerable states which may be, for example, vulnerabilities or exposures in a computing infrastructure.

Contextual visibility impact analysis 220 is performed for discovered vulnerable states. The impact analysis is performed based on multiple factors which relate to the potential impact a particular vulnerable state could have if exploited, likelihood of triggering such a vulnerable state, both, and the like. An example process for performing the impact analysis 220 is described further below with respect to FIG. 5.

Mitigations 230 are performed based on results of the contextual visibility impact analysis 220. Mitigation actions taken pursuant to mitigations 230 may be based on mitigation actions corresponding to respective vulnerable states defined in a mitigation database 235. Performing the mitigations 230 may further include monitoring for exploit attempts.

In accordance with various disclosed embodiments, the mitigations 230 may include, but are not limited to, reachability-related mitigation actions, runtime-related mitigation actions, compiler-related mitigation actions, combinations thereof, and the like. Reachability-related mitigation actions may include, but are not limited to, adjusting configuration of one or more components in the path of reachability between a component reflecting a vulnerable state and one or more assets to be protected from cyber threats. Runtime-related mitigation actions may include, but are not limited to, altering executable code at runtime. Compiler-related mitigation actions may include, but are not limited to, altering compiler code.

Mitigations 230 may be followed by patching operations 240. Such patching may provide more permanent fixes to the vulnerable states mitigated via mitigations 230. In this regard, the mitigations 230 may be utilized in order to mitigate vulnerable states more rapidly than such patching operations 240 can be performed, which in turn allows for securing the relevant assets more effectively than solutions which utilize patching as the main mitigation tool.

When mitigations 230 and any applicable patching operations 240 have been performed, an exploitable vulnerable state may be considered fixed 250. Detection tools may continue monitoring for additional vulnerable states.

Figure 3:
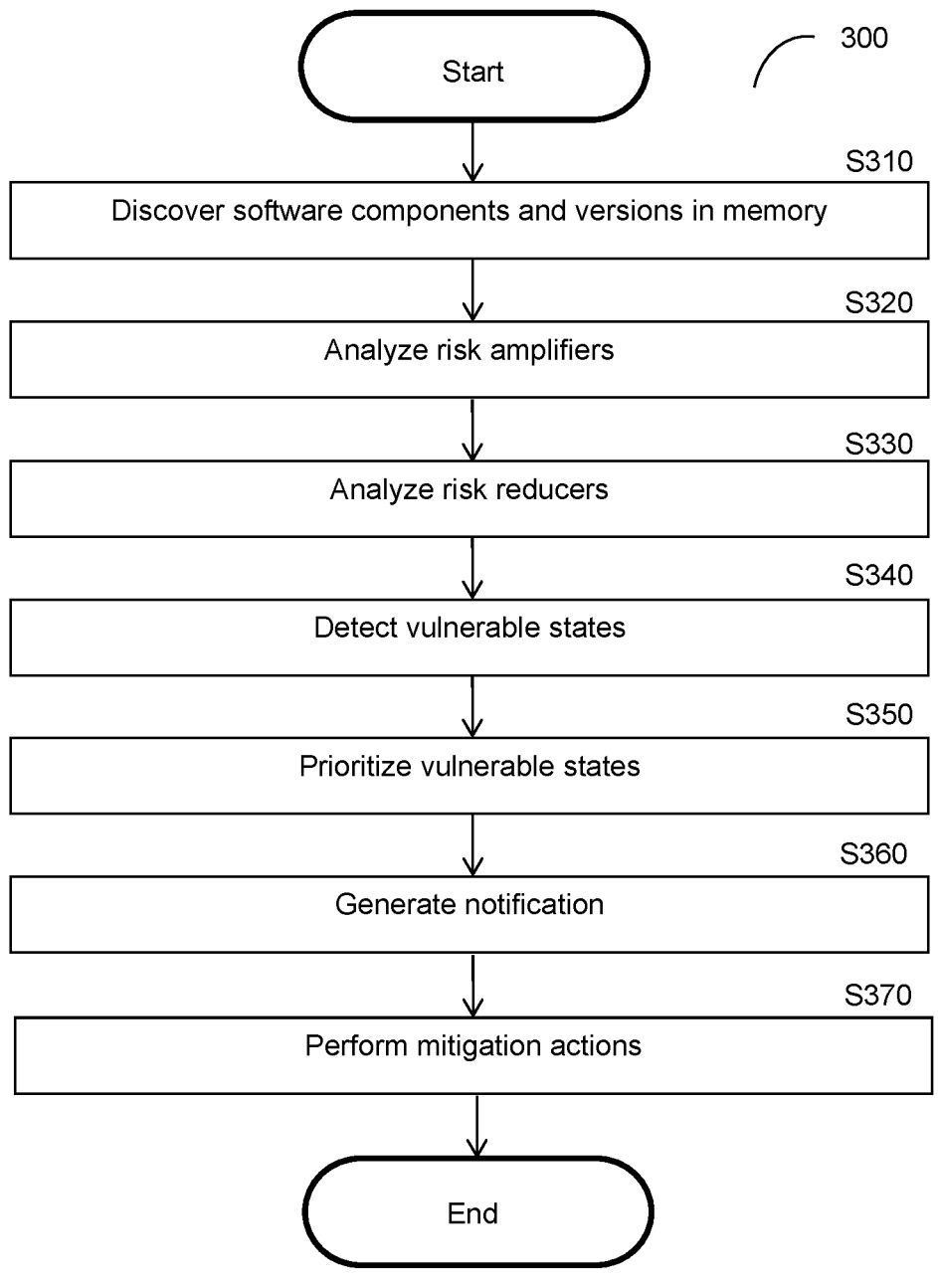
FIG. 3 is a flowchart illustrating a method for mitigating vulnerable states in computing infrastructure according to an embodiment.

FIG. 3 is a flowchart 300 illustrating a method for mitigating vulnerable states in computing infrastructure according to an embodiment. In an embodiment, the method is performed by the mitigator 130, FIGS. 1A-B.

At S310, software components, versions of software components, or both, are discovered in-memory. In an embodiment, S310 includes performing an analysis of data in-memory. More specifically, in some embodiments, the analysis may be performed at least with respect to libraries loaded into memory. That is, software components may be discovered by identifying libraries loaded into memory, where the software components may utilize certain libraries or combinations of libraries at runtime such that each software component corresponds to a respective library or combination of libraries. An example process for discovering software components via in-memory analysis is discussed further below with respect to FIG. 4.

By analyzing software components discovered via in-memory analysis as described herein, data in-memory can be leveraged in order to analyze impact or risk with respect to actual real-time activities rather than solely to categorize software being run in an environment. As discussed below with respect to FIG. 4, various disclosed embodiments further provide techniques which enable or otherwise facilitate analyzing software components in-memory in order to support various disclosed analyses.

It should be noted that S310 is described with respect to discovering software components in-memory, but that in at least some embodiments, additional software components may be discovered outside of in-memory analysis, for example via static scan of program files or other data stored in non-memory data locations.

At S320, an analysis is performed with respect to potential risk amplifiers. The risk amplifiers are factors which amplify or otherwise increase risk of harm by potential vulnerable states.

In an embodiment, S320 includes performing an impact analysis in order to determine one or more impact-related risk amplifiers. The results of the impact analysis may be used as risk amplifiers or otherwise may be utilized in order to determine risk amplifiers to be used in determining the applicable scores. An example process for performing impact analysis is described further below with respect to FIG. 5.

In addition to risk amplifiers related to impact, in some embodiments, S320 may include applying one or more additional risk amplifiers based on factors such as, but not limited to, asset criticality. The asset criticality is based on the potential impact of harm which would be caused by malicious access to one or more assets which are accessible to a software component corresponding to a given vulnerable state. To this end, the asset criticality may be a predetermined value for each software component, or may be determined by applying one or more asset criticality determination rules for each software component. The asset criticality determination rules may be defined with respect to factors such as, but not limited to, tags in an asset inventory (e.g., by identifying predetermined tags known to indicate criticality), name analysis (e.g., by applying predetermined name criticality analysis rules), user inputs (e.g., based on user inputs explicitly indicating that an asset is critical), combinations thereof, and the like.

At S330, an analysis is performed with respect to potential risk reducers. The risk reducers may include, but are not limited to, circumstances that may mitigate risks or otherwise avoid harm posed by vulnerable states (e.g., by preventing or otherwise avoiding exploitation of those vulnerable states). In an embodiment, the risk reductions at least include risk reductions determined based on security controls deployed with respect to the software components affected by the vulnerable states. To this end, in an embodiment, information related to the presence of security controls, capabilities of the security controls, or both, are utilized in order to determine a reduction in impact to be applied (for example, a reduction in impact score). An example method for determining risk reducers with respect to security controls which may be utilized in order to apply risk reductions is described further below with respect to FIG. 6.

In this regard, it is noted that the deployment of certain security controls with respect to certain software components may mitigate the likelihood that vulnerable states will cause harm at runtime or otherwise mitigate a degree of harm such that even a potentially high impact vulnerable state (i.e., a vulnerability which would cause a large amount of harm if exploited) may present a lower overall degree of risk (e.g., because there are appropriate security controls deployed to reduce the likelihood of a successful exploit or to prevent widespread harm even if exploitation is successful).

At S340, potential vulnerable states are detected based on the analyses performed at any or all of S310 through S330. In an embodiment, S340 includes applying one or more vulnerable state identification rules defined with respect to potential deployments, configurations, combinations thereof, and the like, of software components. The vulnerable states may be defined with respect to known kinds of vulnerable states (e.g., vulnerable states among a set of common vulnerabilities and exposures), for example, such that each detected vulnerable state corresponds to one of the known kinds of vulnerable states.

At S350, the vulnerable states are prioritized. In an embodiment, S350 includes performing risk analysis for the vulnerable states with respect to one or more factors such as, but not limited to, reachability, exploitability, security controls (e.g., based on any or a combination of the existence of certain security controls, known capabilities for security controls which are known to be used for certain categories of vulnerable states, known vulnerable states, etc.), asset criticality, combinations thereof, and the like.

In an embodiment, the prioritization is performed with respect to applicable scores such that vulnerable states with higher applicable scores are prioritized over vulnerable states with lower applicable scores Each applicable score is determined based on one or more risk amplifiers and one or more risk reducers. In some embodiments, a score is determined for each vulnerable state on a per-asset basis (i.e., for each instance of that kind of vulnerable state on a respective software component). As noted above, in an embodiment, the risk reductions at least include risk reductions determined based on security controls deployed with respect to the software components affected by the vulnerable states.

The result of determining scores based on risk amplifiers such as exploitability, reachability, and asset criticality, as well as any risk reducers such as risk reducers based on security controls, is an applicable score for each vulnerable state. The applicable score for each vulnerable state is indicative of a risk posed by the potential impact each vulnerable state could have if exploited. Because such an applicable score accounts for potential mitigations of risk due to the presence of certain security controls, the applicable scores will, on average, more accurately represent the urgency of issues presented by different vulnerable states than an analysis that only accounts for impact or otherwise only degree of harm without accounting for potential mitigating factors. This, in turn, allows for more effectively prioritizing cyber threats.

In some embodiments, S350 may further include filtering out at least a portion of the vulnerable states, for example, when the vulnerable states are to be presented in a notification or otherwise when the prioritized vulnerable states are to be mitigated. As a non-limiting example, vulnerable states having applicable scores below a threshold may be filtered out in order to reduce noise among the list of prioritized vulnerable states. When utilized by an administrator for managing mitigation, such a reduced list may allow the administrator to effectively work on mitigation by reducing the number of vulnerable states to include only those that demonstrate the highest risk given the impact. When used for automated mitigation activities, using such a reduced list allows for reducing computing resource usage, for example, computing resources used by cybersecurity tools to perform mitigation, as the amount of vulnerable states being mitigated may be reduced.

At S360, a notification indicating at least results of the risk analysis performed at S350 is generated and sent (e.g., to a user device of an admin of the computing environment in which the software components are deployed). In an embodiment, the notification indicates the vulnerable states organized by priority, for example, with higher priority vulnerable states higher on a list of vulnerable states than lower priority vulnerable states.

In a further embodiment, the notification may further include a textual summary of the applicability or otherwise the potential impact of the vulnerable states. Such a textual summary may include a textual description of one or more of the factors utilized to prioritize the vulnerable states such as risk amplifiers, risk reducers, or both, for example as described below with respect to FIGS. 5 and 6. To this end, in yet a further embodiment, S360 includes applying one or more generative artificial intelligence (AI) models such as, but not limited to, a large language model (LLM), in order to produce such a textual summary. The generative AI model may be trained to output text summarizing the effect of each risk-related factor (i.e., each risk amplifier or risk reducer) based on inputs used to analyze those risk-related factors (e.g., inputs utilized to analyze risk-related factors such as reachability, exploitability, asset criticality, security controls, etc., as discussed herein).

At S370, one or more mitigation actions are performed. More specifically, the mitigation actions may be performed based on the prioritization so as to prioritize performing mitigation actions with respect to higher priority vulnerable states.

In an embodiment, S370 includes applying one or more mitigation engines, where each mitigation engine is configured to perform mitigation actions related to adjusting components. In a further embodiment, the mitigation engines include one or more of a reachability mitigation engine, a runtime mitigation engine, and a compile time mitigation engine. Example techniques for utilizing mitigation engines to perform mitigation actions which may be utilized in accordance with various disclosed embodiments are described further in the above-mentioned U.S. patent application Ser. No. 18/334,007, assigned to the common assignee, the contents of which are hereby incorporated by reference. As discussed in the Ser. No. 18/334,007 application, mitigation actions performed via mitigation engines may be prioritized based on impact analysis (e.g., using impact scores). In accordance with at least some disclosed embodiments, prioritization of mitigation actions to be performed via mitigation engines may be based on the prioritization as discussed above.

In some embodiments, the mitigation actions to be performed may be defined in a playbook, i.e., a predetermined set of mitigation actions for mitigating certain kinds of vulnerable states. Each playbook may correspond to a respective kind of vulnerable state (e.g., a playbook may correspond to each CVE among a known set of common vulnerabilities and exposures [CVEs]).

Alternatively or in combination, S370 may include determining the mitigation actions based on the risk reduction analysis (e.g., a risk analysis as discussed above) for historical vulnerable states. More specifically, such a historical risk reduction analysis may be utilized in order to determine a degree of effect of each security control (e.g., with respect to types of security controls) when utilized to avoid or mitigate different types of vulnerable states. The degree of effect may be determined by applying one or more effect degree determination rules, which may in turn be defined with respect to factors such as, but not limited to, exploitability. As a non-limiting example, a score may be generated based on results of an exploitability analysis (e.g., an exploitability analysis performed as discussed herein) as applied to a certain kind of vulnerable state.

Security controls which are determined to historically have a high degree of effect on certain kinds of vulnerable states may be deployed or otherwise utilized. Further, in some embodiments, scores representing such degrees of effect may be stored in a database for subsequent use such that the historical risk reduction analysis does not need to be performed at each iteration of mitigation. Moreover, the historical risk reduction analysis may be performed with respect to potential groupings of security controls such that the degrees of effects of different combinations of security controls may be scored and utilized to determine which mitigation actions should be performed. As a non-limiting example, security controls among a combination of security controls having a degree of effect above a threshold may be activated, deployed, or otherwise utilized to perform mitigation actions.

Figure 4:
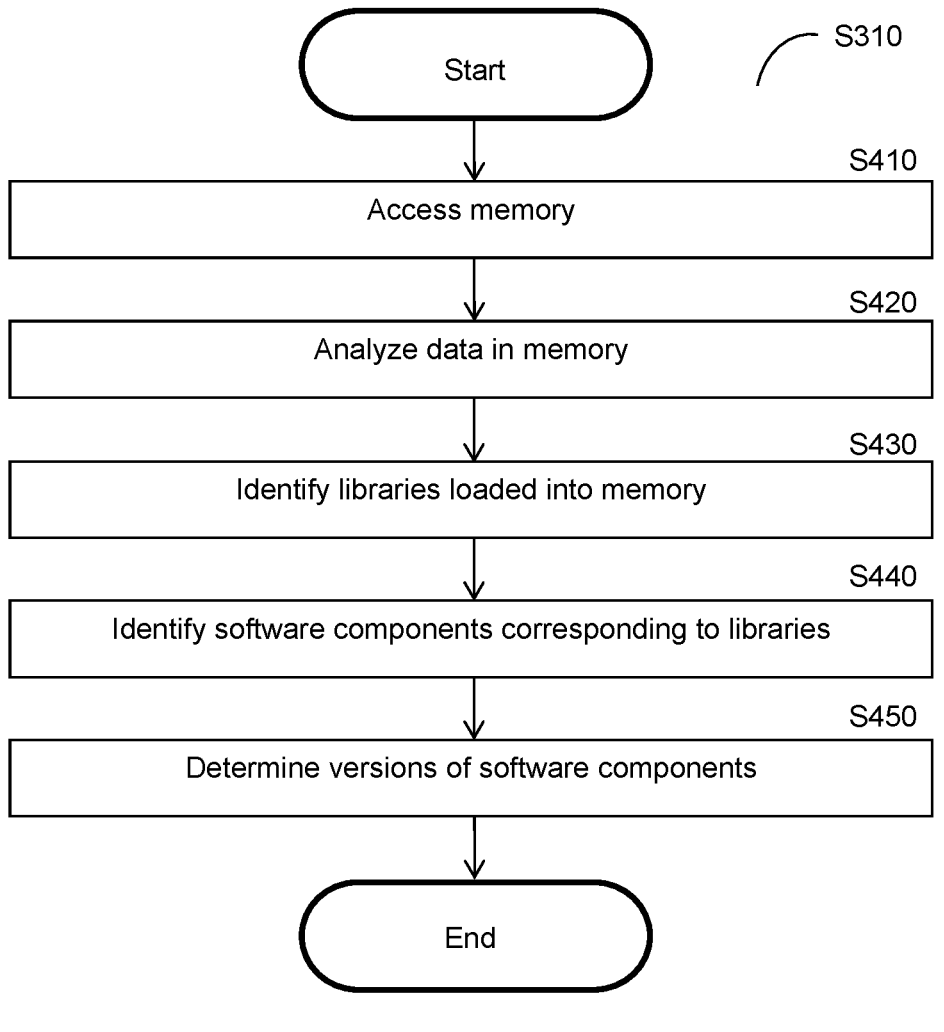
FIG. 4 is a flowchart illustrating a method for discovering software components and versions at runtime according to an embodiment.

FIG. 4 is a flowchart S310 illustrating a method for discovering software components and versions at runtime according to an embodiment.

At S410, a memory is accessed. The accessed memory may be a memory for which software components are to be protected at runtime via in-memory analysis as described herein. Such a memory may be, but is not limited to, a memory in a computing environment to be protected from potential cyber threats.

In an embodiment, S410 further includes accessing one or more existing agents to be utilized to analyze the memory. In a further embodiment, one or more forensic data collection techniques (e.g., real-time response) are utilized with respect to the existing agents by running code (e.g., one or more scripts or other sets of computer readable or executable instructions) that, when executed by a processing circuitry, configure the processing circuitry to analyze a computing environment in which the memory is deployed. Based on the analysis of the computing environment, the memory may be identified and accessed. In another further embodiment, a script including instructions that, when executed by a processing circuitry, configures the processing circuitry to communicate with the memory via an application programming interface (API) and to cause analysis of the memory via the API. Such code may be executed without necessarily deploying a persistent agent.

In such an embodiment, the existing agents may be utilized in order to analyze the memory without deploying a new agent, i.e., while avoiding the need to deploy a new agent. In this regard, it is noted that installing agents, particularly in on-premises networks, typically requires both information technology (IT) or development operations (DevOps) to manually install the agent on each asset (e.g., each asset containing a memory to be analyzed) as well as networking teams to grant connectivity of the asset to a system which the agent will report to (e.g., the mitigator 130, FIG. 1A-B). Accessing existing agents allows for analyzing the memory without needing to install new agents or setting up new tunnels within networks through which analysis results will be reported.

At S420, the data in-memory is analyzed in the accessed memory. In an embodiment, S420 includes applying one or more analysis processes in order to identify data which may be indicative of libraries loaded into the memory. Such libraries may be utilized by respective software components such that the presence of a library in-memory may be utilized to identify a software component within the memory.

In a further embodiment, the analysis processes to use are determined based on a programming language framework or otherwise based on capabilities of code loaded into the memory such that different analysis processes are utilized depending on the programming language framework or other capabilities of code loaded into the memory. To this end, in yet a further embodiment, S420 also includes identifying a programming language framework of program code (i.e., computer-executable instructions) loaded into the memory, and applying a respective search process based on the identified programming language framework. If different portions of the memory contain code having different programming language frameworks, respective search processes may be utilized for those different portions of memory.

In an embodiment, S420 includes searching within the accessed memory for data indicating libraries which are loaded into the memory. Specifically, data structures that describe the loaded libraries are found. Such a search may be utilized to analyze the memory itself which may be relevant, for example, when analyzing code composed in accordance with an interpreter-based framework.

In another embodiment, S420 includes interacting with one or more built-in compilers among code loaded into the memory in order to access data indicating loaded libraries. Such built-in compilers may be available under certain programming language frameworks (e.g., Java), which can be queried or otherwise interacted with in order to retrieve data about libraries associated with the same program as each compiler.

At S430, one or more libraries loaded into the memory are identified based on the analysis of the data in-memory. Each library is a collection of computing resources such as, but not limited to, files, programs, routines, scripts, functions, combinations thereof, and the like. Each library can be referenced in programming code in order to have a processor executing such code to access the contents of the library, thereby allowing for utilizing the resources contained therein.

As noted above, in an embodiment, the memory is searched for data indicating libraries being loaded therein. In an embodiment, the libraries may be identified by analyzing a header file of the library known to contain data identifying the library. The library may be identified, for example, based on a prefix appearing before a header file suffix. As a non-limiting example for a header file having a file name "lib1.h", the ".h" suffix may be utilized to determine that the file is a header file, and the library may be identified as "lib1."

In this regard, it is noted that libraries utilized by certain programs may be dynamically linked and loaded into memory at runtime rather than being statically included within the program file. A static analysis of the program will therefore fail to find any dynamically linked libraries. Accordingly, analyzing data in-memory to identify libraries loaded into memory allows for identifying more potential libraries utilized by programs, which in turn allows for discovering more software components than static analysis alone would yield.

At S440, software components corresponding to the libraries identified at S430 are identified, thereby identifying the software components in-memory. In an embodiment, software components known to be resources among a given library may be included in a predetermined list of software components for each library such that the software components corresponding to each identified library includes each software component among the predetermined list of software components for the library.

At S450, versions of the software components identified at S440 are determined. In an embodiment, the predetermined list of software components for each library may further indicate a version of each software component as used by the library such that the versions of the software components indicated among the predetermined list of software components for the library are determined at S450.

Figure 5:
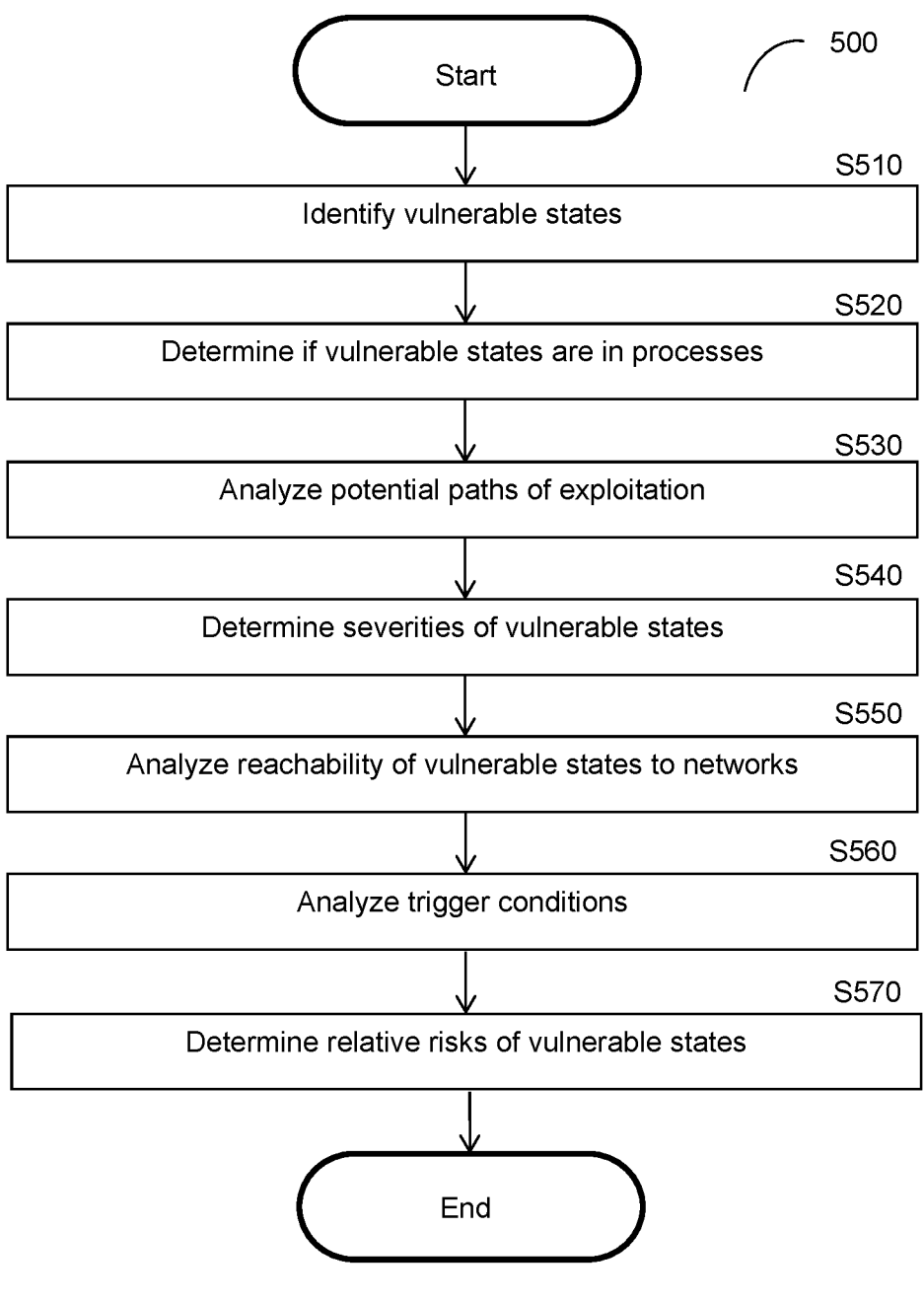
FIG. 5 is a flowchart illustrating a method for prioritizing vulnerable states using risk analysis according to an embodiment.

FIG. 5 is a flowchart 500 illustrating a method for prioritizing vulnerable states based on impact analysis according to an embodiment.

At S510, one or more vulnerable states to be analyzed are identified. The vulnerable states to be analyzed may include, but are not limited to, vulnerable states detected by one or more cybersecurity detection tools or systems. In an embodiment, the vulnerable states to be analyzed include vulnerable states of or related to software components detected via in-memory analysis, for example, as described above with respect to FIG. 3 and, in particular, S340.

At S520, it is determined whether each vulnerable state is detected in a process or in an operating system having built-in processes. In an embodiment, S520 may include collecting information from live processes having built-in mitigation defenses indicating whether such defenses were active.

In a further embodiment, such collection may be realized at least in part by running code (e.g., a script) that, when executed, configures a processing circuitry to analyze the memory and accesses one or more mitigation tools (e.g., existing agents) deployed in order to collect forensic data with respect to the process. Executing a script configured to perform such analysis which collects data via existing agents allows for realizing the collection of information to be used for detecting vulnerable states without necessarily deploying an additional agent in order to collect such data.

At S530, potential paths of exploitation are analyzed for each vulnerable state. In an embodiment, S530 includes analyzing a code path from a vulnerable process to another process or function serving as an asset to be protected. The analysis may be based on data retrieved from other sources, e.g., other components deployed in or with respect to the computing infrastructure indicating communications between and among components of the computing infrastructure and, more specifically, between processes executed via the computing infrastructure. In a further embodiment, S530 may include creating a mapping of such potential paths of exploitation to be used for impact analysis, for example as described further below.

In yet a further embodiment, analyzing the potential paths of exploitation further includes determining how software components associated with the vulnerable states interact with process edges such as, but not limited to, endpoints within a computing environment. Such an endpoint is connected to and communicates via one or more networks such that the endpoint may expose software components to external systems (e.g., systems communicating via the Internet).

To this end, in accordance with various disclosed embodiments, the potential paths of exploitation may be further analyzed with respect to how software components are used while loaded into memory with respect to endpoints. In this regard, S530 may include analyzing code flows of software components at runtime in order to determine which code flows are in use for each software component. Such code flows may be compared to predetermined code flows known to be used by software components while a vulnerable state is being exploited (e.g., based on previously observed behaviors during known exploitations or predefined code flows for a given exploitation technique). In this regard, it is noted that code flows known to be in use while exploiting a particular vulnerable state may be indicative that an asset (e.g., a software component) whose runtime behavior exhibits that code flow is at higher risk for exploitation. This, in turn, may be utilized in order to determine a degree of risk amplification with respect to potential exploitation.

At S540, a severity of each vulnerable state is determined. In an embodiment, the severity may be a predetermined value defined in one or more severity rules based on known types of alerts or otherwise severity values corresponding to predetermined data provided by detection tools.

At S550, a reachability is determined for each vulnerable state with respect to one or more networks or subnetworks through which protected assets (e.g., processes or other components deployed in the infrastructure) are accessible. In an embodiment, S550 may include determining whether a process or other component affected by the vulnerable state is capable of reaching the Internet or a network or subnetwork where one or more predetermined assets (e.g., processes or components deployed in the computing infrastructure) to be protected from vulnerabilities reside. Such determination may be based on the output of detection tools (e.g., the detection tools 150, FIGS. 1A-B), which may be configured to provide indications of whether certain vulnerable states have reachability to particular networks or components. To this end, in some embodiments, S550 includes creating a mapping including paths from different protected assets which go through other components that lead to the Internet or one or more other external networks. Such mapping may be utilized, for example, for impact analysis as described further below.

In an embodiment, S550 may include identifying one or more paths from each protected asset to the Internet or a public-facing network or subnetwork. Moreover, the path may be defined with respect to security control integrations which are configured to detect vulnerabilities, mitigate vulnerabilities, or both. In a further embodiment, S550 includes applying one or more predetermined reachability analysis rules defined with respect to predetermined security control integrations, where each security control integration is a process or other component configured to detect vulnerabilities, to mitigate vulnerabilities, or both. Using paths defined with respect to security control integrations allows for providing visibility into the security controls which are in place within a given computing infrastructure. In combination with awareness regarding the posture of the computing infrastructure, mitigation rules can be defined more granularly in order to optimize mitigation while minimizing potential negative effects of changes performed pursuant to mitigation.

In a further embodiment, S550 may also include identifying and integrating with security controls which are deployed and configured in a manner that allows for accessing data related to connections between software components and other components or systems inside or external to a computing environment. Such integration allows for accessing the connections data in order to analyze how software components may be exposed to traffic and external events.

To this end, in some embodiments, the reachability of a software component may be defined with respect to a path between the software component and the Internet or other public network, and more specifically may be defined with respect to security controls deployed in-line with the path or otherwise deployed to collect data about communications via the path. Such security controls are assets configured to detect or mitigate exploitation attempts for certain kinds of vulnerable states.

In this regard, it is noted that defining reachability with respect to security controls collecting data along the path between the software component and the Internet allows for more accurately characterizing potential reachability when considering risk reducers related to such security controls as described herein. In contrast to existing solutions which may attempt to discover all resources in a computing environment through which a software component may be reached from the Internet, focusing on a path defined with respect to security controls may unearth new contextual information relevant to reducing risk and otherwise reduce potential noise due to largely irrelevant resources along the path (i.e., resources which are largely irrelevant for purposes of determining how easy it is to reach or otherwise access the software component via the Internet). Defining reachability paths with respect to security controls therefore allows for more accurately determining a degree of risk amplification related to reachability, which in turn allows for more accurately prioritizing and mitigating vulnerable states as described herein.

At S560, trigger conditions are analyzed for each vulnerable state in order to determine a relative complexity of triggering each vulnerable state. To this end, S560 may include determining a relative level of complexity of the conditions required to be met in order for the vulnerable state to cause unintended access or disruption to normal processes. Determining such a complexity may further include applying one or more trigger complexity rules with respect to potential conditions for triggering vulnerable states. In a further embodiment, S560 includes determining a likelihood that a vulnerable state is triggered via a network. Such a likelihood may, in turn, be utilized to categorize the vulnerable state (e.g., into categories such as "triggerable via network" or "triggerable via endpoint").

At S570, impacts of the vulnerable states are determined. In an embodiment, S570 includes generating scores for the vulnerable states based on one or more factors such as, but not limited to, whether each vulnerable state is detected in a process or system having built-in processes, whether each vulnerable state imposes a path of exploitation, a severity of each vulnerable state, a reachability of each vulnerable state to a network through which protected assets can be accessed, complexity of trigger conditions for triggering the vulnerable state (e.g., to trigger the state to cause improper exposure of assets or otherwise grant improper access), combinations thereof, portions thereof, and the like. In a further embodiment, these factors may be assigned weighted values and aggregated in order to determine a weighted score for each vulnerable state. To this end, S570 may include determining a value representing each impact-related factor.

Figure 6:
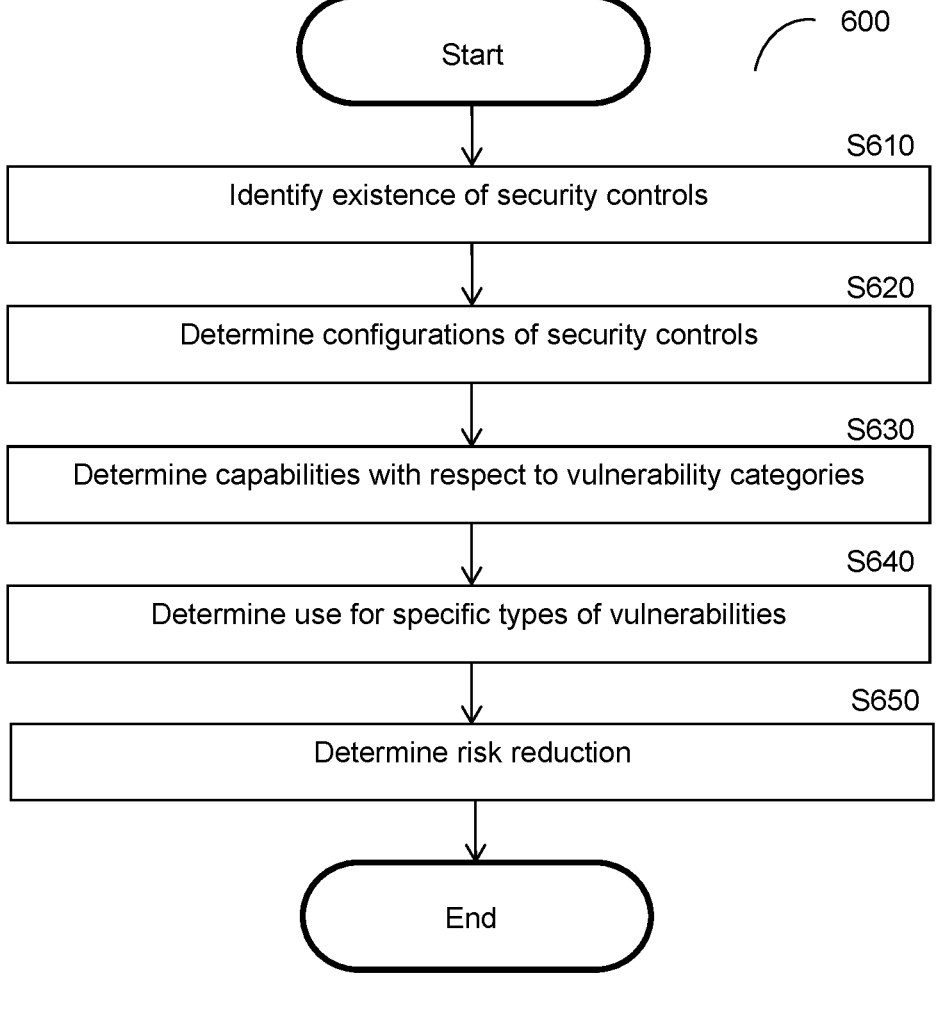
FIG. 6 is a flowchart illustrating a method for determining risk reducers with respect to security controls according to an embodiment.

FIG. 6 is a flowchart 600 illustrating a method for determining risk reducers with respect to security controls according to an embodiment. In an embodiment, the method is performed by the mitigator 130, FIGS. 1A-B.

At S610, security controls deployed with respect to one or more computing environments are identified such that the existence of each security control is determined as a potential risk reducer factor. In an embodiment, the security controls identified at S610 are or include security controls discovered as discussed above with respect to FIGS. 3 and 4.

At S620, configurations of the security controls are determined. In an embodiment, the configurations may be determined with respect to predetermined sets of configuration settings. Such configuration settings may be a predetermined set of configuration settings for each type of security control, may be defined for different kinds of vulnerable states (e.g., different CVEs), combinations thereof, and the like. The configurations may be utilized to determine the degree of risk reduction, and may further be analyzed based on historical risk reduction for different kinds of vulnerable states. As a non-limiting example, configurations which historically were effective at avoiding or mitigating cyber threats with respect to a certain kind of vulnerable state may be determined as effective against that kind of vulnerable state such that risk is reduced with respect to the same kind of vulnerable state when those configurations are present.

At S630, capabilities of the security controls are determined with respect to one or more categories of vulnerable states. In an embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain categories of vulnerable states. Such scoring of capabilities' effectiveness in avoiding or mitigating vulnerable states may be utilized, for example, in order to determine a total risk reduction for the security controls (e.g., based on any or all of presence of security controls, capabilities with respect to categories of vulnerable states, capabilities with respect to specific types of vulnerable states, combinations thereof, and the like).

In an embodiment, S630 includes determining a type of trigger for each security control defined with respect to one or more networks. In a further embodiment, the type of trigger is either triggerable via those networks or triggerable only locally (e.g., via endpoints but not via external systems via those networks). In yet a further embodiment, the type of trigger for each security control may be determined based further on a reachability analysis (e.g., a reachability analysis as described further above). The type of trigger for each security control may be utilized, for example, in order to determine capability scores. As a non-limiting example, predetermined capability scoring rules may score security controls which are capable of being triggered via networks higher (i.e., representing that the security controls are more capable of mitigating vulnerable stats) than security controls which are only capable of being triggered locally.

At S640, capabilities of the security controls for mitigating specific types of vulnerable states are determined. Such capabilities may be capabilities defined as being utilized to prevent or otherwise mitigate exploitation of the vulnerable state. In a further embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain specific types of vulnerable states. A specific type of vulnerable state may be a particular known vulnerability or exploit, for example, as defined in a set of common vulnerabilities and exploits (CVEs).

As a non-limiting example for a security control in the form of a web application firewall (WAF), a WAF with rules or other settings known to block a specific type of vulnerable state (e.g., a specific CVE) is determined to be capable of mitigating that type of vulnerable state. As another non-limiting example for a WAF security control, a WAF with a generic rule that blocks certain kinds of attack vectors (e.g., structured query language injections) known to be associated with a specific CVE is determined to be capable to mitigating that CVE.

At S650, a degree of risk reduction is determined based on the existences of the security controls, the configurations of the security controls, the capabilities with respect to vulnerability categories, the capabilities for mitigating specific types of vulnerabilities, or a combination thereof. In an embodiment, S650 may include determining one or more risk reduction scores representing a degree of risk reduction for each security control, a combined score representing an aggregate degree of risk reduction for the security controls, and the like. Such scores may be utilized to determine an applicable score as discussed above.

Figure 7:
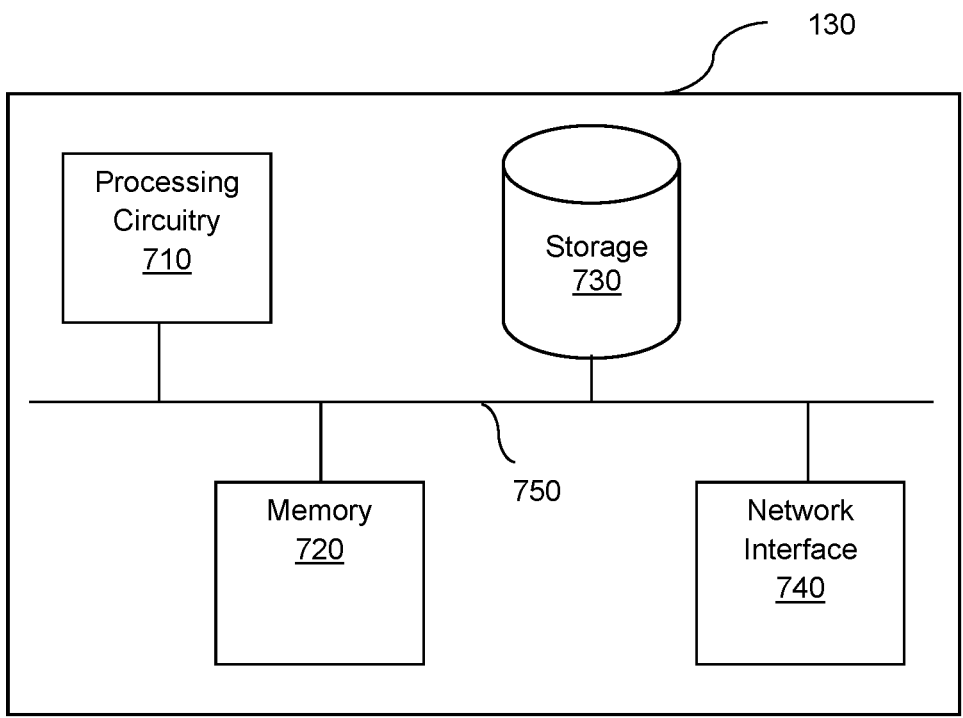
FIG. 7 is a schematic diagram of a mitigator according to an embodiment.

FIG. 7 is an example schematic diagram of a mitigator 130 according to an embodiment. The mitigator 130 includes a processing circuitry 710 coupled to a memory 720, a storage 730, and a network interface 740. In an embodiment, the components of the mitigator 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the mitigator 130 to communicate with, for example, the compute servers 120, the mitigation knowledge base 140, the CI/CD manager 110, the detection tools 150, and the like.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating cyber-threats, including:
analyzing data in-memory for at least one software component during execution of each of the at least one software component, wherein the analyzed data includes at least one library loaded into a memory, wherein the at least one software component is executed within the memory;
generating a base risk score based on the analysis of the data in-memory;
analyzing a configuration of each of at least one security control with respect to the at least one software component;
analyzing a plurality of capabilities of each of the at least one security control wherein the plurality of capabilities of each of the security controls are analyzed with respect to categories of vulnerabilities, wherein the categories of vulnerabilities are determined based on a plurality of probabilities, wherein the plurality of probabilities is divided into at least one probability of being triggered via a network and at least one probability of being triggered via an endpoint;
generating an applicable score based on the base risk score and the analysis of the configuration of each of the at least one security control, wherein the applicable score is also based on the plurality of capabilities of each of the at least one security control; and
mitigating at least one cyber-threat with respect to the at least one software component based on the applicable score.

2. The method of claim 1, wherein analyzing the data in-memory further comprises:
identifying the at least one library loaded into the memory; and
identifying the at least one software component corresponding to the at least one library loaded into the memory.

3. The method of claim 1, further comprising:
applying a generative artificial intelligence (AI) model to generate a textual applicable score analysis based on the applicable score and the analysis of the data in-memory, wherein the textual applicable score analysis describes a history of potential vulnerabilities for the at least one software component.

4. The method of claim 1, wherein the base risk score is generated with respect to at least one of: exploitability of the at least one software component, and reachability of the at least one software component.

5. The method of claim 1, wherein the base risk score is generated with respect to asset criticality of at least one asset accessible via the at least one software component.

6. The method of claim 1, further comprising:
determining an existence of each of the at least one security control, wherein the applicable score is determined based further on the determined existence of each of the at least one security control.

7. A non-transitory computer readable medium having stored thereon instructions for causing a processing circuitry to execute a process, the process comprising:
analyzing data in-memory for at least one software component during execution of each of the at least one software component, wherein the analyzed data includes at least one library loaded into a memory, wherein the at least one software component is executed within the memory;
generating a base risk score based on the analysis of the data in-memory;
analyzing a configuration of each of at least one security control with respect to the at least one software component;
analyzing a plurality of capabilities of each of the at least one security control wherein the plurality of capabilities of each of the security controls are analyzed with respect to categories of vulnerabilities, wherein the categories of vulnerabilities are determined based on a plurality of probabilities, wherein the plurality of probabilities is divided into at least one probability of being triggered via a network and at least one probability of being triggered via an endpoint;
generating an applicable score based on the base risk score and the analysis of the configuration of each of the at least one security control, wherein the applicable score is also based on the plurality of capabilities of each of the at least one security control; and mitigating at least one cyber-threat with respect to the at least one software component based on the applicable score.

8. A system for mitigating cyber-threats, comprising:

a processing circuitry; and a memory, the memory containing instructions that, when executed by the processing circuitry, configure the system to:

analyze data in-memory for at least one software component during execution of each of the at least one software component, wherein the analyzed data includes at least one library loaded into a memory, wherein the at least one software component is executed within the memory;

generate a base risk score based on the analysis of the data in-memory;

analyze a configuration of each of at least one security control with respect to the at least one software component;

analyze a plurality of capabilities of each of the at least one security control wherein the plurality of capabilities of each of the security controls are analyzed with respect to categories of vulnerabilities, wherein the categories of vulnerabilities are determined based on a plurality of probabilities, wherein the plurality of probabilities is divided into at least one probability of being triggered via a network and at least one probability of being triggered via an endpoint;

generate an applicable score based on the base risk score and the analysis of the configuration of each of the at least one security control, wherein the applicable score is also based on the plurality of capabilities of each of the at least one security control; and mitigate at least one cyber-threat with respect to the at least one software component based on the applicable score.

9. The system of claim 8, wherein the system is further configured to:

identify the at least one library loaded into the memory; and identify the at least one software component corresponding to the at least one library loaded into the memory.

10. The system of claim 8, wherein the system is further configured to:

apply a generative artificial intelligence (AI) model to generate a textual applicable score analysis based on the applicable score and the analysis of the data in-memory, wherein the textual applicable score analysis describes a history of potential vulnerabilities for the at least one software component.

11. The system of claim 8, wherein the base risk score is generated with respect to at least one of: exploitability of the at least one software component, and reachability of the at least one software component.

12. The system of claim 8, wherein the base risk score is generated with respect to asset criticality of at least one asset accessible via the at least one software component.

13. The system of claim 8, wherein the system is further configured to:

determine an existence of each of the at least one security control, wherein the applicable score is determined based further on the determined existence of each of the at least one security control.

* * * * *